(12) United States Patent
Race

(10) Patent No.: US 8,540,426 B2
(45) Date of Patent: Sep. 24, 2013

(54) COMPOSTABLE NATURAL-FIBER FOOD STORAGE BAG

(76) Inventor: Elizabeth Race, Cazenovia, NY (US)

( * ) Notice: Subject to any disclaimer, the term of this patent is extended or adjusted under 35 U.S.C. 154(b) by 240 days.

(21) Appl. No.: 13/009,503

(22) Filed: Jan. 19, 2011

(65) Prior Publication Data

US 2011/0176749 A1 Jul. 21, 2011

Related U.S. Application Data

(60) Provisional application No. 61/296,618, filed on Jan. 20, 2010.

(51) Int. Cl.
*B65D 30/02* (2006.01)
*B65D 33/24* (2006.01)
*B65D 30/20* (2006.01)

(52) U.S. Cl.
USPC .................................. 383/1; 383/96; 383/120

(58) Field of Classification Search
USPC .................. 383/1, 84, 86, 120; 229/928, 938
See application file for complete search history.

(56) References Cited

U.S. PATENT DOCUMENTS

| | | | |
|---|---|---|---|
| 2,945,617 A * | 7/1960 | Normandin ................... | 229/67.3 |
| 3,289,915 A * | 12/1966 | Civitello ....................... | 383/126 |
| 3,414,185 A * | 12/1968 | Young .............................. | 229/75 |
| 3,977,596 A * | 8/1976 | Gamble ........................... | 383/10 |
| 4,059,222 A * | 11/1977 | Gamble ........................... | 383/10 |
| 4,500,021 A * | 2/1985 | Bildusas .......................... | 225/49 |
| 4,797,010 A * | 1/1989 | Coelho .......................... | 383/109 |
| 4,974,966 A | 12/1990 | Fabbi | |
| 5,065,868 A | 11/1991 | Cornelissen et al. | |
| 5,177,660 A | 1/1993 | Kilner | |
| 5,507,579 A | 4/1996 | Sorenson | |
| 5,679,421 A | 10/1997 | Brinton, Jr. | |
| 2002/0164088 A1* | 11/2002 | Collins ............................ | 383/10 |
| 2006/0292951 A1* | 12/2006 | Dutkiewicz et al. ............ | 442/79 |
| 2007/0148384 A1* | 6/2007 | Bowden et al. .............. | 428/35.7 |

FOREIGN PATENT DOCUMENTS

GB 2455599 A * 6/2009

* cited by examiner

*Primary Examiner* — Jes F Pascua
(74) *Attorney, Agent, or Firm* — Bernhard P. Molldrem, Jr.

(57) ABSTRACT

A biodegradable natural-fiber disposable food storage container for storing a serving of food is formed of an envelope made of a generally unitary blank of a suitable paper that is generally resistant to food fluids such as blood, juices, sauces, etc., but admits at least some permeation of water vapor and atmospheric fluids. Accordion-fold side panels allow the envelope to store flat and open up to accommodate the food article. Two half-panels join at an overlap to form a closed front panel. A water-based glue closes the envelope sides and base, while a repositionable adhesive on the flap closure allows the envelope to be opened and resealed.

5 Claims, 4 Drawing Sheets

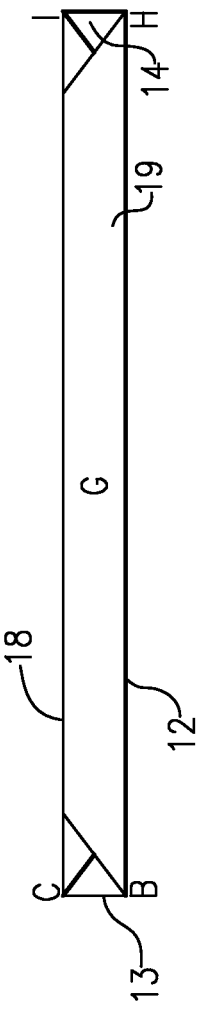
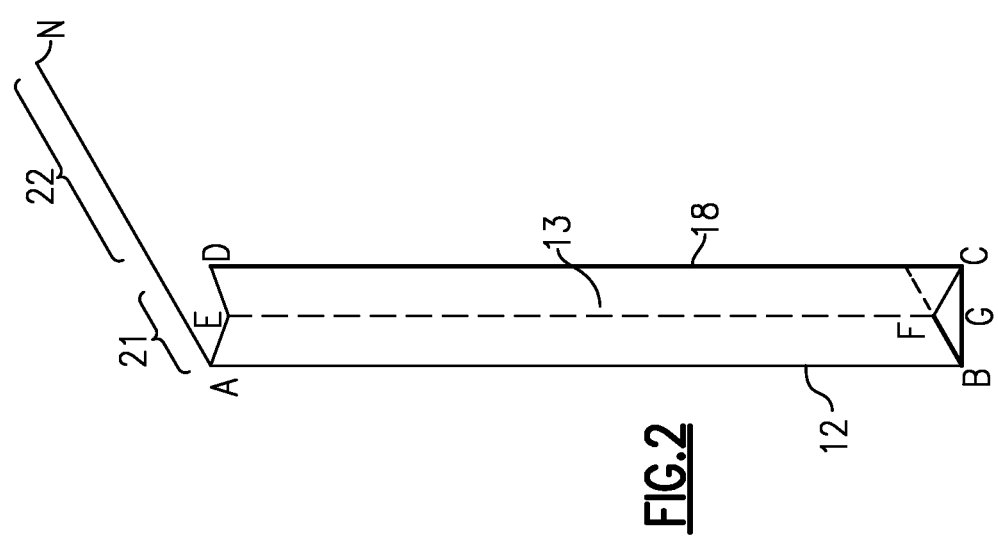

COMPOSTABLE NATURAL-FIBER FOOD STORAGE BAG

Priority is claimed under 35 USC §119(e) for Provisional Application 61/296,618, Jan. 20, 2010.

BACKGROUND OF THE INVENTION

The present invention relates to a natural-fiber food storage bag or similar flexible disposable container for storing a serving of food, and which is naturally biodegradable in landfill or compost. The present invention is more particularly concerned with a paper packaging for food items, e.g., natural food items, such as meats, cheeses, fruit, vegetables, and sandwiches, snack food (e.g., potato chips) and other items that can be packed and carried, or reserved for the purpose of eating later.

A common problem with existing food storage bags is that they are typically made of non-biodegradable materials, e.g., polyethylene or plastic-coated or impregnated materials, that take many years to bio-degrade. The composition of these bags makes them non-compostable. If they are returned to the earth, e.g., in compost or landfill, the bag material can release synthetic chemicals and materials which are harmful to the environment. This results in the landfill or other disposal site needing additional work or equipment to maintain, so the product becomes less cost effective in the long run, if one considers the costs of disposal/recycling. The materials used in the conventional sandwich bags and food storage bags are typically impervious to water vapor and other atmospheric gases, which can limit the storage life of many fresh food items, e.g., fruits and vegetables.

Prior paper sandwich bag constructions are described in Sorenson U.S. Pat. No. 5,507,579 (Apr. 16, 1996) and in Fabbi U.S. Pat. No. 4,974,966 (Dec. 4, 1990). Neither of these achieves the objective of being biodegradable nor being convenient to use.

SUMMARY OF THE INVENTION

The sandwich bag (or other food storage bag) is formed of an envelope made of a generally unitary blank of a suitable single-thickness of paper that has high resistance to food fluids such as blood, juices, sauces, etc., but admits at least some permeation of water vapor and atmospheric fluids. The paper material is not coated or impregnated with synthetic materials that resist breakdown in compost or landfill. A type of white butcher paper, described below, has been found to be suitable as the envelope material. A water-based permanent glue or cement is applied to the seams, which are folded to and cemented to form the envelope. A biodegradable low-strength adhesive, i.e., a repositionable adhesive, is used on the envelope flap so it can be closed over the sandwich or other food item, and which allows the flap to be opened and re-closed. The sides may be accordion folded or at least double folded so that the envelope can be stored in compact form, e.g., flat, and then when needed for use can be opened and expanded to hold the sandwich.

In a favorable implementation, a natural fiber food storage bag is designed to be suitable for containing a serving of a sandwich or other comestible food product and is naturally biodegradable when disposed after use in landfill or compost. The bag is formed of an envelope of a paper material adapted to be resistant to oils and food juices, but which permits gradual permeation of atmospheric gases and moisture and which is free of non-biodegradable chemical additives. The envelope is unitarily formed having a back panel; accordion-fold left and right side panels joined by fold lines to the back panel; left and right half-panels joined to the left and right side panels and adapted to meet and cement together to form a closed front panel; a bottom panel that extends at least along a bottom edge of the back panel; a top panel extending from a top edge of the back panel, and extending beyond the closed front panel; and a closure flap extending from the top panel and adapted to cover an upper portion of the front panel. A water-soluble permanent glue cements the edge portions of the left and right half panels and cements an edge portion of the bottom panel to the front panel. A repositionable adhesive is applied onto one or both of the closure flap and the upper portion of the front panel, permitting bag to be opened and resealed. In one favorable example, the bag may have dimensions of about 6½ inches by about 7½ inches with a depth of one to two inches. The food storage bag or envelope can be constructed in a variety of other sizes and shapes.

The main principles invention may be explained with reference to a preferred embodiment, as illustrated in the accompanying Drawing figures.

DESCRIPTION OF THE DRAWING

FIG. 2 is a left-side elevation showing the gusseted (i.e., accordion fold) left side panel and showing the top flap extending from a top edge of the back panel out and over the front panel.

FIG. 3 is a bottom view showing the bottom flap or panel.

DETAILED DESCRIPTION

Figure 1:
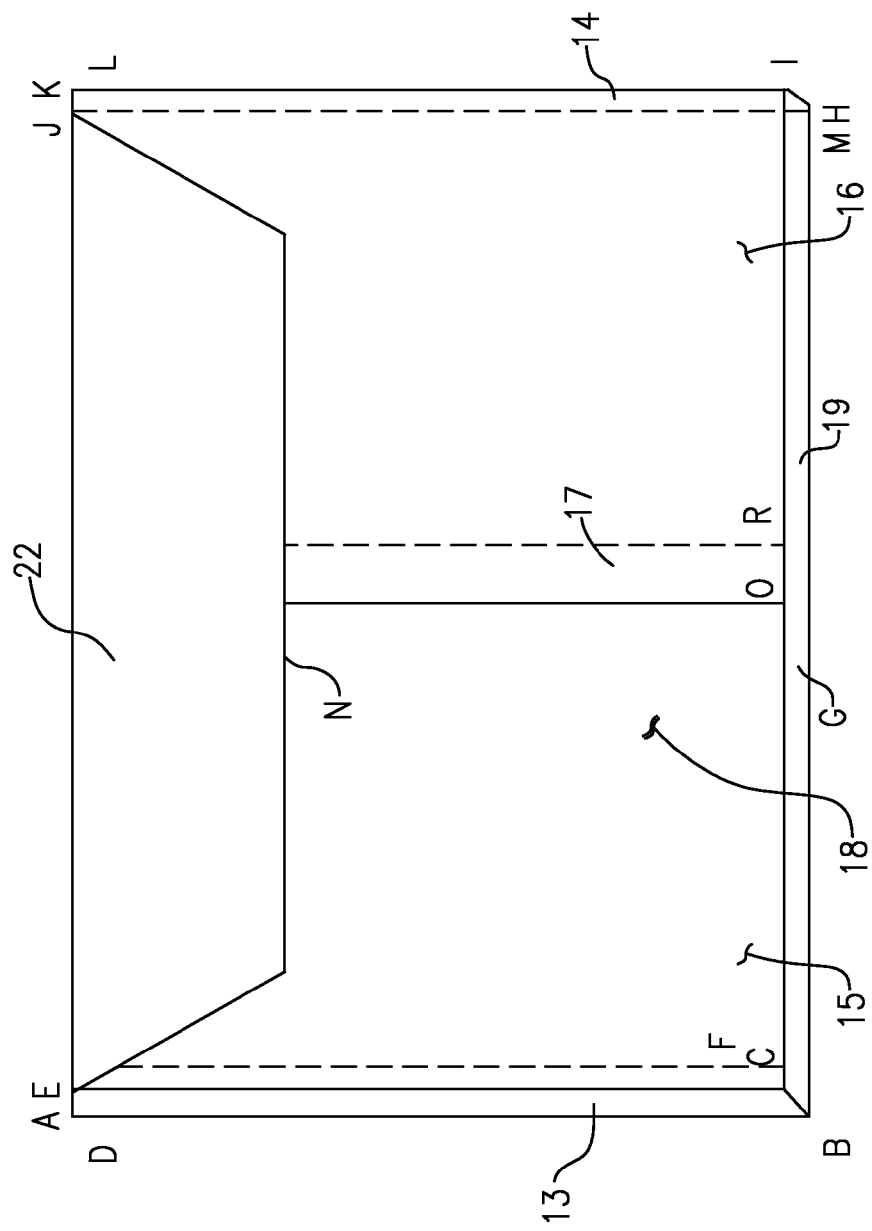
FIG. 1 is an isometric view of an embodiment of this invention, showing the front panel, formed of two half-panels cemented together at respective joining edges, a fold-over flap, one accordion-fold side panel, and the bottom panel. Reference letters A to R identify points or corners on the envelope or envelope blank, and are used to identify corresponding points on subsequent drawing figures.
Figure 4:
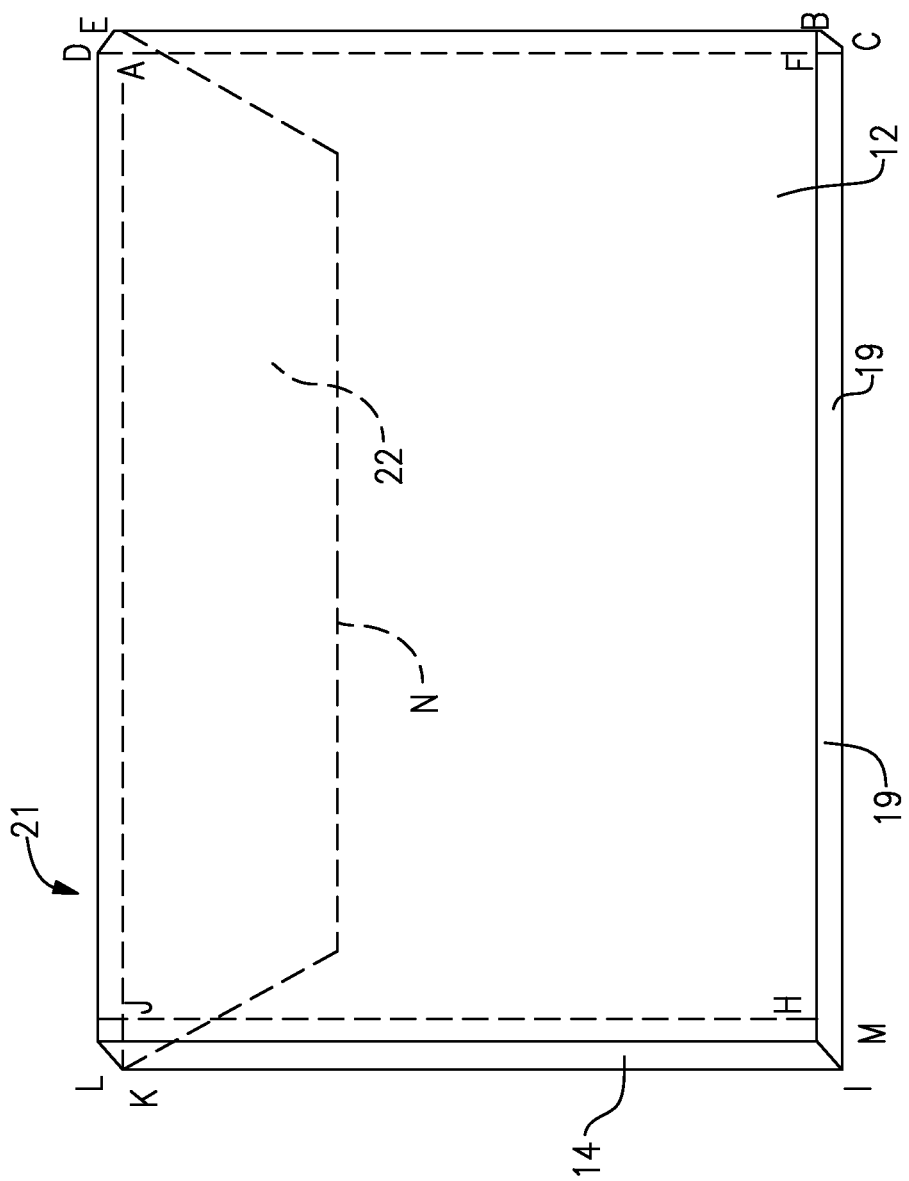
FIG. 4 is an isometric view of the back panel, with fold lines of the side panel illustrated in dash lines (i.e., broken lines) and with the closure flap illustrated also in dash lines.

The sandwich bag according to one preferred embodiment of the invention is formed of an envelope blank 10 with a rectangular back panel 12, left and right bi-fold side panels 13, 14 and left and right front half-panels 15, 16. The half-panels are cemented, by a permanent water-based glue 30, at overlapping edges (e.g., 17) to form a closed rectangular front panel 18 (See FIG. 1). A bottom panel, i.e., strip 19, has the glue 30 applied at an edge strip 19*a*, and this edge strip 19*a* is folded up to make a permanent join at the front panel 12 where the portions of the edge strip 19*a* that extend below the bifold side panels 13, 14 left and right half panels 15, 16, and of the front panel 12 contact one another to form a bi-fold bottom panel. The side panel 14 is defined by the fold lines between points A and B, C and D, and E and F, while the side panel is defined by the fold lines shown between points J and H, L and M, and K and I. Point G identifies a center of the bottom strip 19. The lines of overlap of the two half-panels 16 and 18 (to define the overlapping edges 17), are defined by the lines O to P and R to Q.

A rectangular strip 21 joined to the top edge of the back panel 12 serves as a top panel, and a closure flap 22 (here, generally trapezoidal in shape) extends from the upper edge of this strip 21. The flap 22 overlaps the closed front panel 12 as shown at point N. A repositionable adhesive 32 is applied to the edges of the flap 22 so that it can be closed against an upper part of the front panel 18, as shown in FIG. 1. The adhesive 32 could alternatively be applied at the corresponding position of the front panel. The repositionable adhesive has a low adhesive strength, permitting the flap 22 to be re-opened and then re-sealed a number of times.

Figure 5:
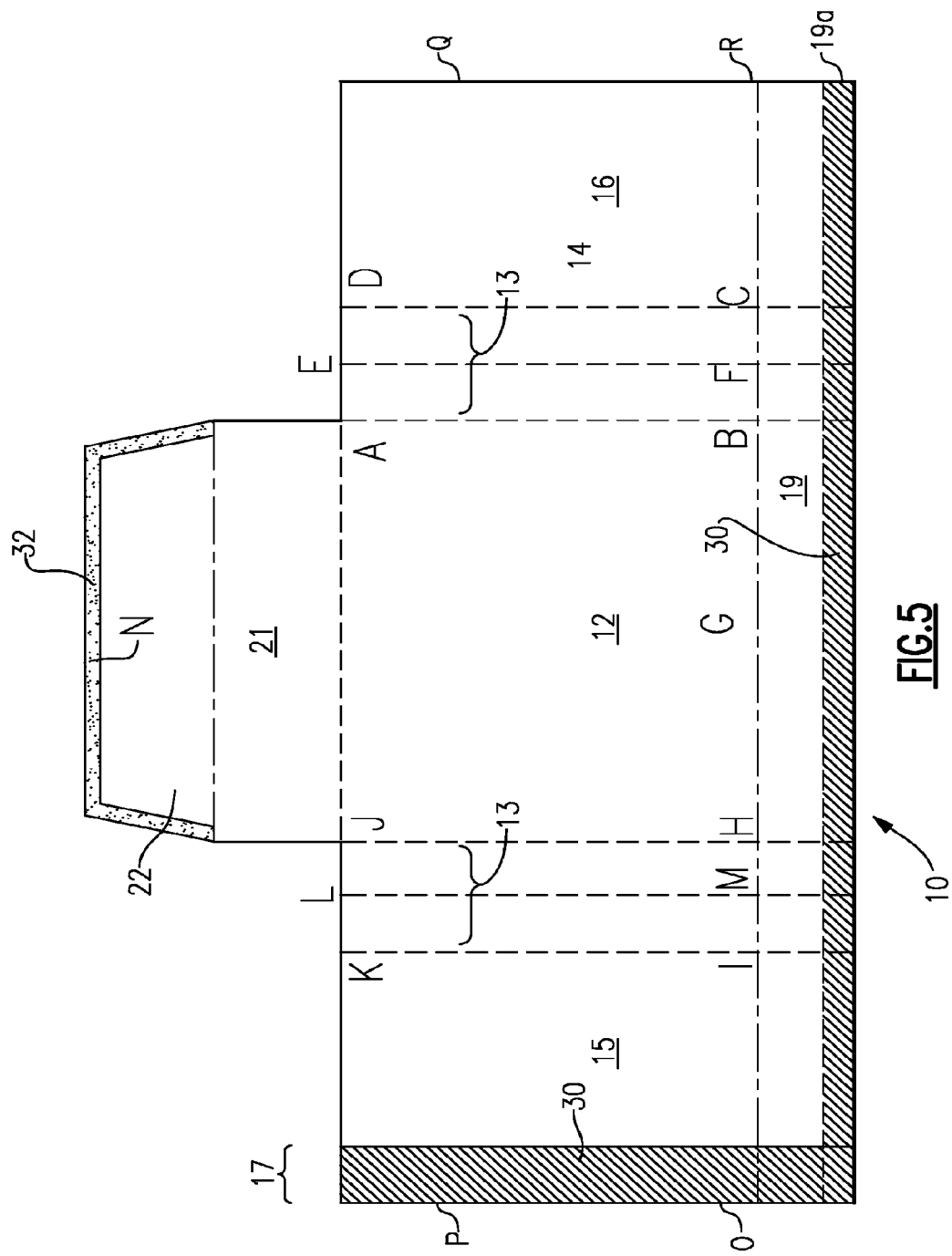
FIG. 5 is a layout view of the paper envelope blank, showing cut lines, fold lines, score lines, and areas receiving the water-based permanent glue and the repositionable adhesive, respectively. This view represents one of many possible embodiments.

In the illustrated embodiment, the bag has a general dimension of about 7.5 inches by 6.5 inches, with accordion-fold side edges about one to two inches in width. This will accommodate most sandwiches. The dimensions of the various elements of the blank 12, and positions of the score lines and fold lines are shown on FIG. 5.

Both the permanent glue 30 and the repositionable adhesive 32 are approved food-grade adhesives materials, and will bio-degrade when disposed as landfill or compost.

The preferred fiber material for the envelope blank is Tarpon® brand white butcher paper (also known as deli paper), and is commercially available from Gordon Paper Company. This is a durable material, resistant to blood, oil, juices, liquid sauces, but is also "breathable" and permits slow permeation of air and other gases as well as water vapor. The paper is free of non-biodegradable synthetic organic materials. If disposed of as compost, the paper, glue, and adhesive will disintegrate within weeks and will degrade into basic elements by action of bacteria in the soil or compost pile.

The white butcher paper also retains inks and dyes, and permits labeling or marking of the bag as to its contents, e.g., "pastrami", "no onions", etc. The bag may also be printed with the name of the store or restaurant, or with a coupon to be used at a later visit.

The bags are provided in a stack or package, in which each unused bag is stored flat. The bags open out to allow the sandwich (up to two inches thick) to be inserted and stored.

No plastics or metals are involved. Other size and shape containers and food storage products may be constructed without departing from the main principles of the invention.

While the invention has been described in terms of a preferred embodiment, it should be appreciated that many variations thereof are possible and would present themselves to persons of skill in the art without departing from the scope and spirit of this invention.

I claim:

1. Natural fiber food storage bag suitable for containing a serving of a comestible food product, the food storage bag being naturally biodegradable after use in landfill or compost, comprising:
   an envelope formed of a blank of single thickness butcher paper material adapted to be resistant to oils and food juices, but which permits gradual permeation of atmospheric gases and moisture and which is free of non-biodegradable chemical additives; the envelope being formed unitarily from said blank, the blank having
   a back panel;
   accordion fold left and right side panels joined by fold lines to said back panel;
   left and right half-panels joined to said left and right side panels, and having overlapping end portions adapted to meet and cement together to form a closed front panel;
   a bottom panel that extends at least along a bottom edge of the back panel, and continues along bottom edges of the left and right half panels that constitute the front panel to the overlapping end portions thereof, the bottom panel having an edge portion extending its length to said overlapping end portions;
   a top panel extending from a top edge of the back panel; and
   a closure flap extending from the top panel and adapted to cover an upper portion of said front panel;
   a water-based permanent glue cementing edge portions of the left and right half panels and cementing said edge portion of the bottom panel at the front panel to corresponding edge portions of the bottom panel that extend along the bottom edges of the left and right half panels; and
   a repositionable adhesive applied onto one or both of the closure flap and the upper portion of the front panel.

2. The food storage bag of claim 1 wherein said back panel is substantially 7.5 inches wide and 6.5 inches high; and wherein said accordion fold side edges are about one to two inches in width.

3. The food storage bag of claim 1 wherein said envelope is composed of a white butcher paper.

4. The food storage bag of claim 1 wherein said repositionable adhesive has a low adhesive strength and permits the closure flap to be reopened and resealed a plurality of times.

5. The food storage bag of claim 1 wherein the bag is formed of a unitary blank of said single thickness butcher paper material.

* * * * *